(12) United States Patent
Na et al.

(10) Patent No.: US 9,891,440 B2
(45) Date of Patent: Feb. 13, 2018

(54) INFRARED INTERACTIVE REMOTE CONTROL DEVICE AND PROJECTION SYSTEM USING SAME

(71) Applicant: PIQS TECHNOLOGY (SHENZHEN) LIMITED, Shenzhen, Guangdong (CN)

(72) Inventors: Qinglin Na, Shenzhen (CN); Yan Huang, Shenzhen (CN); Haohuang Mai, Shenzhen (CN); Haixiang Wang, Shenzhen (CN)

(73) Assignee: PIQS TECHNOLOGY (SHENZHEN) LIMITED, Shenzhen (CN)

( * ) Notice: Subject to any disclaimer, the term of this patent is extended or adjusted under 35 U.S.C. 154(b) by 227 days.

(21) Appl. No.: 14/655,341

(22) PCT Filed: Dec. 31, 2012

(86) PCT No.: PCT/CN2012/088124
§ 371 (c)(1),
(2) Date: Jun. 25, 2015

(87) PCT Pub. No.: WO2014/101226
PCT Pub. Date: Jul. 3, 2014

(65) Prior Publication Data
US 2015/0338667 A1    Nov. 26, 2015

(51) Int. Cl.
*G06F 3/0354*    (2013.01)
*F21S 10/00*    (2006.01)
*G03B 21/54*    (2006.01)
*G02B 27/20*    (2006.01)
*G03B 21/14*    (2006.01)
*G02B 27/14*    (2006.01)
(Continued)

(52) U.S. Cl.
CPC ........... *G02B 27/20* (2013.01); *G02B 27/141* (2013.01); *G03B 21/142* (2013.01); *G03B 21/54* (2013.01); *G06F 3/033* (2013.01); *G06F 3/03542* (2013.01); *F21S 10/007* (2013.01); *G03B 21/53* (2013.01)

(58) Field of Classification Search
CPC ..... G02B 27/20; G06F 3/03542; G06F 3/033; F21S 10/007; F21W 2131/406; F21V 14/08; G03B 21/00; G03B 21/54
USPC ............................. 353/42, 43; 116/288, 297
See application file for complete search history.

(56) References Cited

U.S. PATENT DOCUMENTS 5,450,148 A * 9/1995 Shu ........................ G02B 27/20
353/42

FOREIGN PATENT DOCUMENTS

CN    101833385 A    9/2010

* cited by examiner

*Primary Examiner* — Ryan Howard

(57) ABSTRACT

Provided are infrared interactive remote control devices and projection systems using same, which can distinguish an indication state and an interactive control state. A pattern disc rotatable around a rotating shaft is provided in the infrared interactive remote control device. In a normal state, a visible light source works independently, and indication pattern holes in the pattern disc are positioned on an optical path to allow visible light to pass through, so that indication light spots corresponding to the indication pattern holes are formed. When a control button is pressed down, the visible light source and an infrared light source work together, and the pattern disc is driven to rotate, so that the control pattern holes are positioned on the optical path to allow the visible light to pass through, and control light spots corresponding to the control pattern holes are formed to indicate an interactive control state.

15 Claims, 4 Drawing Sheets

(51) Int. Cl.
*G06F 3/033* (2013.01)
*G03B 21/53* (2006.01)

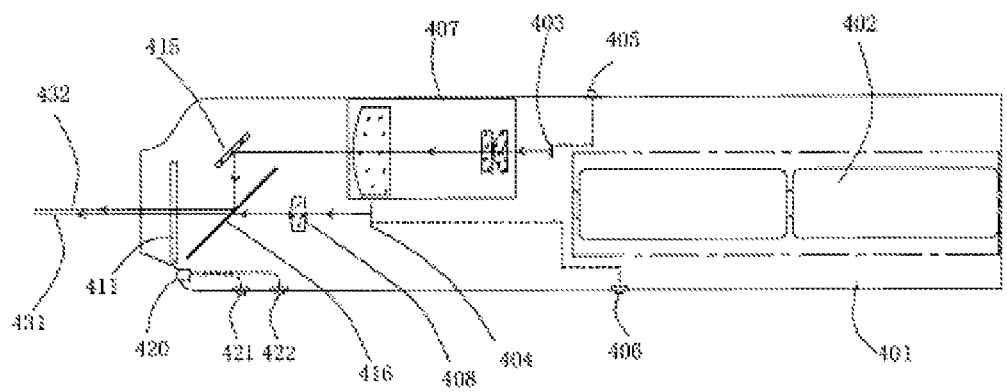
Figure 3
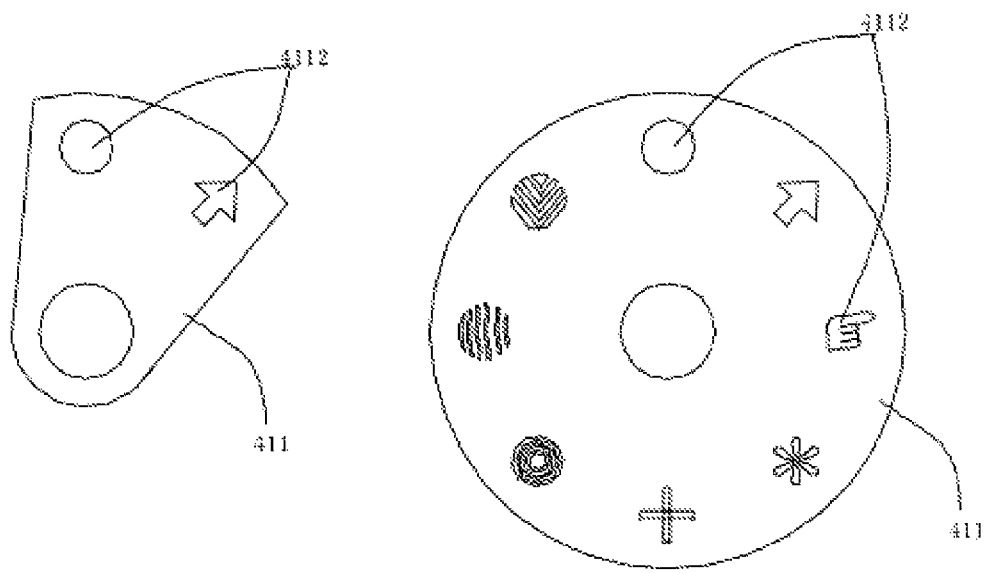
Figure 4                    Figure 5

INFRARED INTERACTIVE REMOTE CONTROL DEVICE AND PROJECTION SYSTEM USING SAME

TECHNICAL FIELD

This disclosure relates to projection systems, and more particularly to infrared interactive remote control devices used in projection systems and projection systems using the same.

BACKGROUND

Chinese patent with publication No. 101833385A discloses a remote control interactive pen and a receiver thereof. In this remote control interactive pen, a visible laser module emits visible light so that an operator can freely control movement of the interactive pen and know accurate position and motion trajectory of the interactive pen, while an infrared laser module emits infrared light so that the receiver may detect a projection position of the infrared laser module and convert the position information into mouse signal for interactive operation.

However, light spot is constantly formed by the visible light from the visible laser module no matter whether the infrared laser module is started in such remote control interactive pen, and thus it is impossible to distinguish a current working state. That is, an indication state or an interactive control state cannot be distinguished for the current working state. Although the operator can perceive by deciding whether the button is pressed down or not, there is still no visual effect. For other people except the operator, since they are not involved in the operation, it is more impossible to distinguish that it is currently in the indication state or it has entered into the interactive control state.

SUMMARY OF THIS DISCLOSURE

Aiming at the above-described defects in the prior art, the problem to be solved in this disclosure is to provide infrared interactive remote control devices capable of distinguishing an indication state from an interactive control state.

To solve the above technical problem, this disclosure provides an infrared interactive remote control device. The infrared interactive remote control device includes a housing, where a power supply, a visible light source and an infrared light source are mounted within the housing, and visible light and infrared light are emitted out along a same optical axis after passing through a light splitting element. The power supply is connected with the visible light source through a first switch unit. The power supply is connected with the infrared light source through the first switch unit and a second switch unit successively, or the power supply is directly connected with the infrared light source through a second switch unit; where the second switch unit includes a control button. A pattern disc which is rotatable around a rotating shaft is disposed within the housing and arranged on an optical path of the visible light source, where at least two pattern holes allowing the light to pass through are arranged on the pattern disc. The control button of the second switch unit is in mechanical connection with the pattern disc and can drive the pattern disc to rotate about the rotating shaft. In a normal state, an indication pattern hole of the at least two pattern holes is positioned on the optical path to allow the visible light to pass through. When the control button is pressed down, the control button synchronously drives the pattern disc to rotate so that a control pattern hole of the at least two pattern holes is positioned on the optical path to allow the visible light to pass through.

In a preferred embodiment of the infrared interactive remote control device of this disclosure, the visible light from the visible light source passes through a first lens assembly and one of the pattern holes on the pattern disc, transmits through a first light splitting element and then emits out; the infrared light from the infrared light source passes through a second lens assembly, gets reflected by a first reflector and the first light splitting element, and then emits out with the visible light after the two merge together.

In another preferred embodiment of the infrared interactive remote control device of this disclosure, the visible light from the visible light source passes through a first lens assembly and then transmits through a first light splitting element; the infrared light from the infrared light source passes through a second lens assembly, gets reflected by a first reflector and the first light splitting element, and then merges with the visible light, where the merged visible light and infrared light are emitted out through one of the pattern holes on the pattern disc.

In another preferred embodiment of the infrared interactive remote control device of this disclosure, the visible light from the visible light source passes through a first lens assembly and one of the pattern holes on the pattern disc, gets reflected by a second reflector and a second light splitting element, and then emits out; the infrared light from the infrared light source passes through a second lens assembly, transmits through the second light splitting element, and then emits out together with the visible light after it merges with the visible light. Alternatively, positions of the pattern disc and the second reflector are exchanged with each other.

In another preferred embodiment of the infrared interactive remote control device of this disclosure, the visible light from the visible light source passes through a first lens assembly, gets reflected by a second reflector and a second light splitting element, and then emits out; the infrared light from the infrared light source passes through a second lens assembly, transmits through the second light splitting element, and then merges with the visible light, where the merged visible light and infrared light are emitted out through one of the pattern holes on the pattern disc.

The visible light source is a LASER one, a VCSEL one or an LED one, and its emergent light angle from the first lens assembly is less than 2 degree. The infrared light source is a LASER one, a VCSEL one or an LED one, and its emergent light angle from the second lens assembly is less than 2 degree.

In the infrared interactive remote control device of this disclosure, a remote control unit operable to send remote control signal to a projection system is arranged within the housing. The remote control unit includes an infrared modulated light generator and at least one remote control button connected therewith.

A projection system including a projection module and an infrared monitoring module is also provided in this disclosure. The projection module includes a projection light source and a projection objective, where light from the projection light source is emitted out after successively passing through a third light splitting element and a first lens group of the projection objective. The infrared monitoring module includes a monitoring objective and an sensor chip. An optical axis of the infrared monitoring module at rear of the third light splitting element is coaxial with that of the projection objective. The projection system also includes the above-described infrared interactive remote control device.

Infrared light emitted from the infrared interactive remote control device is projected onto a projection plane of the projection system, and the infrared light reflected by the projection plane passes through the first lens group and the third light splitting element to the infrared monitoring module.

In the projection system of this disclosure, the projection objective is also provided with a second lens group, and the third light splitting element is arranged between the first and the second lens groups. The light from the projection light source is emitted out after passing through the second lens group, the third light splitting element and the first lens group successively.

In the projection system of this disclosure, a focusing device is also provided for driving one or more lens of the first lens group to move back and forth. Optical characteristics of the projection objective and the monitoring objective can ensure that, during telescopic movement of the one or more lens of the first lens group driven by the focusing device, while the projection objective focuses clearly, the infrared monitoring image received by the sensor chip meets monitoring requirements synchronously.

It can be seen from the above-described technical solutions that, the pattern disc which can rotate around a rotating shaft is additionally provided in the infrared interactive remote control device of this disclosure. In a normal state, the visible light source works independently, and the indication pattern hole on the pattern disc is positioned on the optical path to allow the visible light to pass through, so that indication light spot corresponding to the indication pattern hole is formed in this case. When a control button is pressed down, the visible light source and the infrared light source work together, and the control button synchronously drives the pattern disc to rotate, so that the control pattern hole is positioned on the optical path to allow at least the visible light to pass through, and control light spot corresponding to the control pattern hole is formed to indicate that the device is currently in the interactive control state. Adopting this infrared interactive remote control device in a projection system, both operators and onlookers can clearly distinguish that the device is currently in the indication state or has entered into the interactive control state.

BRIEF DESCRIPTION OF THE DRAWINGS

FIG. 3 is a structural diagram for an infrared interactive remote control device in a third embodiment of this disclosure;

FIG. 4 is a structural diagram for a pattern disc of this disclosure;

FIG. 5 is a structural diagram for another pattern disc of this disclosure;

DETAILED DESCRIPTION

Figure 1:
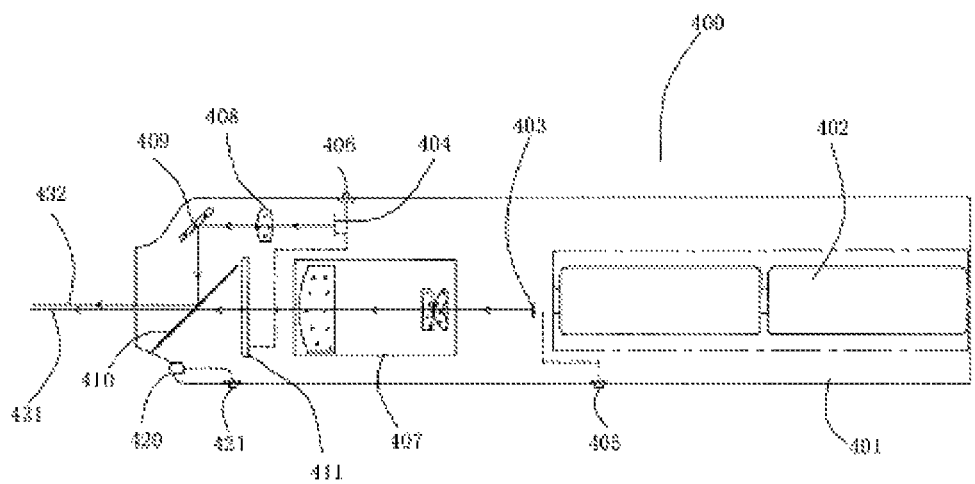
FIG. 1 is a structural diagram for an infrared interactive remote control device in a first embodiment of this disclosure.

FIG. 1 illustrates an infrared interactive remote control device in a first embodiment of this disclosure. The infrared interactive remote control device 400 includes a housing 401, and a power supply 402, a visible light source 403 and an infrared light source 404 are mounted within the housing 401.

The power supply 402 can be a battery, and it also can be connected to an external power source in some specific implementation. Regarding circuit configuration, the power supply 402 is respectively connected with the visible light source 403 through a first switch unit 405 and with the infrared light source 404 through a second switch unit 406. That is, the two light sources are independently controlled by two switches, and thus work independently. Specifically, the power supply 402 can be connected with the infrared light source 404 through the first switch unit 405 and the second switch unit 406 successively. In this case, the first switch unit 405 is equal to a master switch which simultaneously controls the power supply of the whole infrared interactive remote control device, while the second switch unit 406 is operable to control the infrared light source individually. In this embodiment, the second switch unit is a mechanical-controlled button.

It can be seen from FIG. 1 that, a pattern disc 411 which can rotate around a rotating shaft is also provided within the housing and positioned on an optical path of the visible light source. Visible light 431 from the visible light source 403 passes through a first lens group 407 and one of pattern holes on the pattern disc, transmits through a first light splitting element 410, and then emits out. Infrared light 432 from the infrared light source 404 passes through a second lens group 408, gets reflected by a first reflector 409 and the first light splitting element 410, and then emits out with the visible light after the two merge together. The first light splitting element 410 here can transmit visible light and/or reflect infrared light. Specifically, it can be a semi-transmitting and semi-reflecting optical element to both visible light and infrared light. The visible light and the infrared light are emitted out coaxially after passing through the first light splitting element 410.

The second switch unit 406 (i.e., the control button in FIG. 1) is in mechanical connection with the pattern disc 411 and can drive the pattern disc to rotate about the rotating shaft. Such mechanical connection is illustrated by dash lines in the figure. It is well-known technology to drive a component to have reciprocating movement from a first position to a second position by a mechanical button, and thus there is no detailed illustration about the control button herein. As shown in FIG. 4, two pattern holes 4112 are arranged on the pattern disc 411. Provided that the circular hole refers to an indication pattern hole, the arrow hole refers to a control pattern hole. Alternatively, if the arrow hole refers to an indication pattern hole, the circular hole refers to a control pattern hole. The pattern disc 411 shown in FIG. 5 is provided with eight pattern holes 4112. In practical operation, one of the pattern holes should be fixed to be the indication pattern hole, while another one should be deemed as the control pattern hole. Two adjacent holes are preferably preset in this way. Such presetting can be finished during manufacture; alternatively, users can make some adjustments and presetting on their own based on corresponding structural arrangement. For example, the arrow hole and the palm hole can be respectively selected to be the indication pattern hole and the control pattern hole.

When the visible light source is started by the first switch unit 405 and the second switch unit 406 has not been pressed down, the visible light source 403 works independently, and the indication pattern hole on the pattern disc 411 is positioned on the optical path to allow the visible light to pass through, in which case indication spot corresponding to the indication pattern hole is formed to indicate that the device is currently in an indication state. When the second switch unit 406 is pressed down, the visible light source 403 and the infrared light source 404 work together, and the second switch unit 406 synchronously drives the pattern disc 411 to rotate, so that the control pattern hole is positioned on the optical path to allow the visible light to pass through. In this case, control light spot corresponding to the control pattern hole is formed to indicate that the device is currently in an interactive control state. Adopting this infrared interactive remote control device 400 in a projection system, both operators and onlookers can clearly distinguish that the device is currently in the indication state or has entered into the interactive control state.

It can be seen from FIG. 1 that, a remote control unit operable to send remote control signal to the projection system is also arranged within the housing 401. This remote control unit directly sends the control signal to a host, which works in a similar way to an infrared remote controller equipped for a conventional projection system or a television. The infrared light source 404 operates to emit the infrared light to the projection plane to meet the interactive control requirements. The remote control unit includes an infrared modulated light generator 420 and a remote control button connected therewith. The remote control button in FIG. 1 is a host switch 421, while the remote control button in FIGS. 2-3 includes a host button 421 and one or more function button(s) 422.

The visible light source 403 can be a LASER one, a VCSEL one or an LED one, and its emergent light angle from the first lens assembly is less than 2 degree. The infrared light source 404 can be a LASER one, a VCSEL one or an LED one, and its emergent light angle from a second lens assembly is less than 2 degree.

Figure 2:
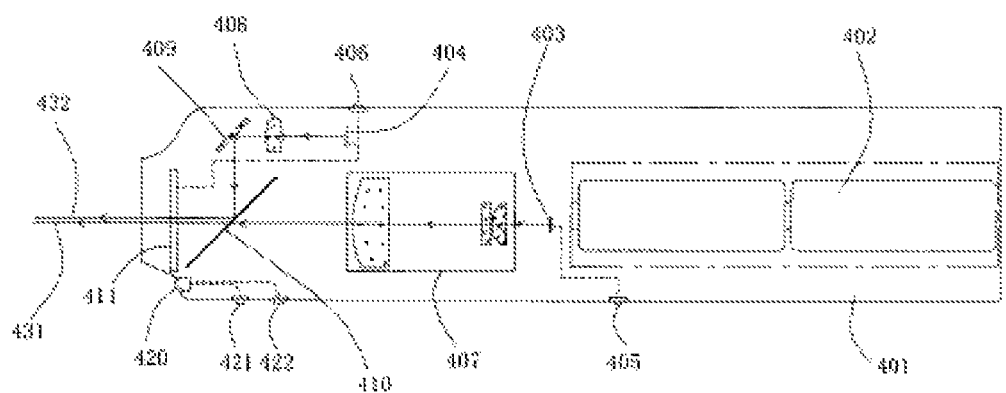
FIG. 2 is a structural diagram for an infrared interactive remote control device in a second embodiment of this disclosure.

FIG. 2 illustrates an infrared interactive remote control device in a second embodiment of this disclosure. Differences between these two embodiments in FIGS. 1 and 2 lie in the mounting position of the pattern disc. It can be seen from the figures that, the visible light from the visible light source 403 passes through the first lens group 407 and transmits through the first light splitting element 410, while the infrared light from the infrared light source 404 first passes through a second lens group 408, gets reflected by a first reflector 409 and the first light splitting element 410, and then merges with the visible light, where the merged visible light and infrared light are emitted out through one of the pattern holes on the pattern disc 411.

FIG. 3 illustrates an infrared interactive remote control device in a third embodiment of this disclosure. Differences between these two embodiments in FIGS. 2 and 3 lie in that the positions of the visible light source 403 and the infrared light source 404 are exchanged with each other. The visible light from the visible light source passes through a first lens assembly 407, gets reflected by a second reflector 415 and a second light splitting element 416, and then emits out; the infrared light from the infrared light source 404 passes through a second lens assembly 408, transmits through the second light splitting element 416, and then merges with the visible light, where the merged visible light and infrared light are emitted out through one of the pattern holes on the pattern disc 411. It can be seen that the second light splitting element 416 herein can transmit infrared light and reflect visible light. Specifically, the second light splitting element is a semi-transmitting and semi-reflecting optical element to both infrared light and visible light.

In specific implementation, the pattern disc 411 can be positioned between the first lens assembly 407 and the second reflector 415 shown in FIG. 3, or it can be positioned between the second reflector 415 and the second light splitting element 416.

Figure 6:
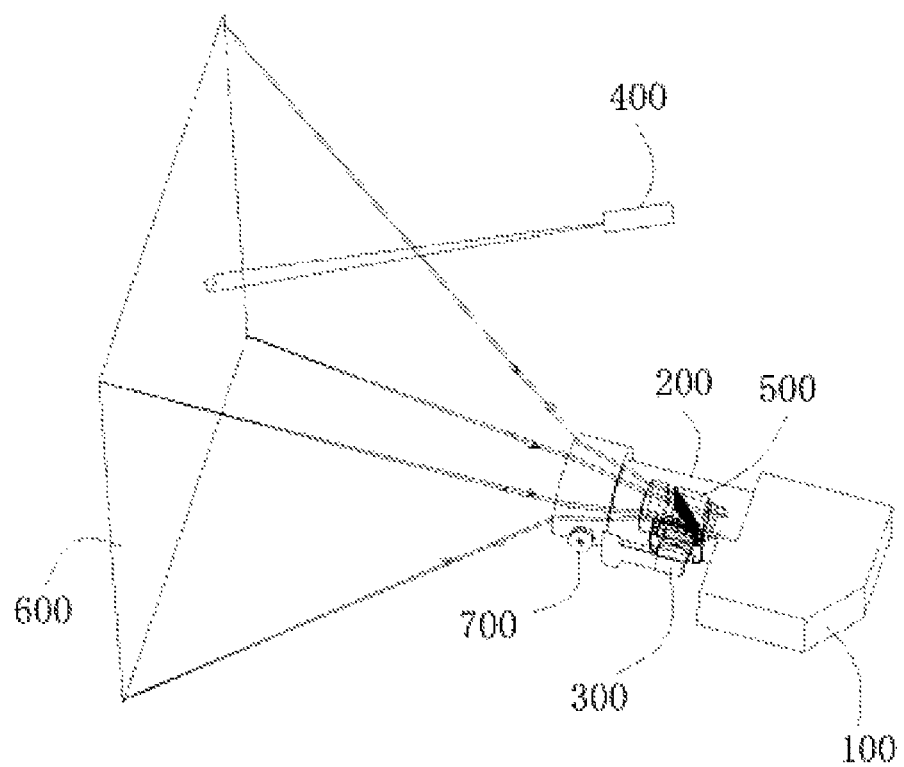
FIG. 6 is a structural diagram for a projection system in a preferred embodiment of this disclosure.
Figure 7:
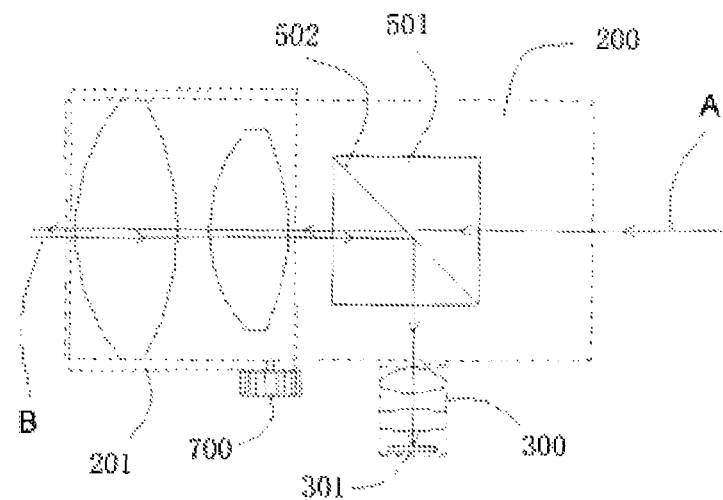
FIG. 7 is a structural diagram for a projection objective and an infrared monitoring module in the projection system shown in FIG. 6.
Figure 8:
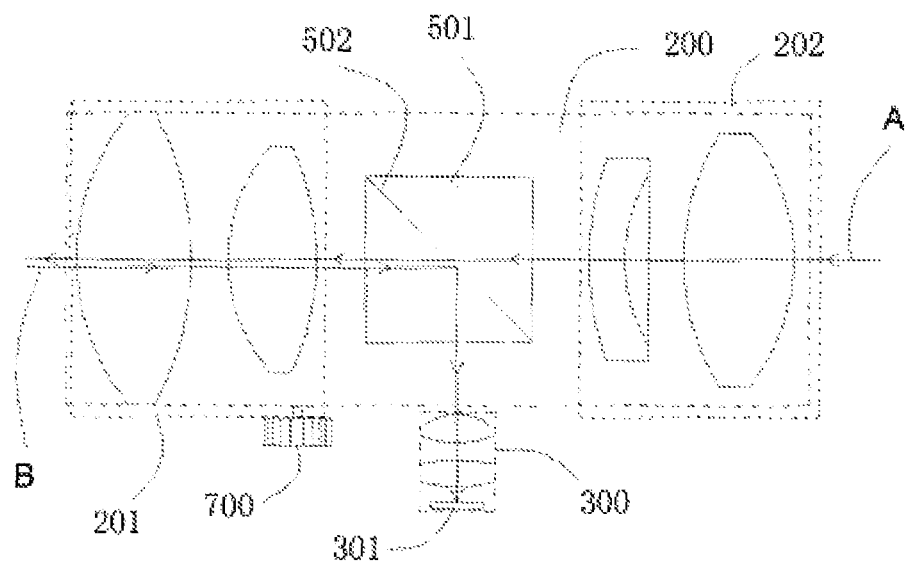
FIG. 8 is another structural diagram for a projection objective and an infrared monitoring module in the projection system shown in FIG. 2.

FIGS. 6-8 illustrate embodiments for applying the above-described infrared interactive remote control device into a projection system. As shown in FIGS. 6-7, the projection system includes a projection module and an infrared monitoring module 300. The projection module includes a projection light source 100 and a projection objective 200, where light from the projection light source 100 is emitted out after successively passing through a third light splitting element 500 and a first lens group 201 of the projection objective 200. Infrared light from the infrared interactive remote control device 400 is projected onto a projection plane of the projection system, and the infrared light reflected by the projection plane successively passes through the first lens group 201 and the third light splitting element 500 to the infrared monitoring module 300. The infrared monitoring module 300 includes a monitoring objective and an sensor chip 301 arranged within the monitoring objective. The third light splitting element 500 can reflect infrared light but transmit visible light.

When operators use the above-described infrared interactive remote control device 400, they may select a conventional indication function, or the infrared light source can be started to enable the interactive control function. Projection light beam is emitted from the projection light source 100 and then projected onto the projection plane 600 through the projection objective 200. When light spot from the infrared interactive remote control device 400 has been present on the projection plane, continuous infrared images can be immediately sampled by the sensor chip 301 within the infrared monitoring module 300 once the infrared light source 404 is started, and then an interactive control unit can use software algorithm to determine position of the light spot and recognize motion trajectory of the light spot, thereby achieving the interactive function as well as mouse function. In this case, both the operators and onlookers can clearly distinguish that the device is currently in an indication state or has become an interactive control state.

For the embodiment shown in FIG. 7, the first lens group 201 can move back and forth (specifically, one or more lens can move back and forth), while the third light splitting element 500 is a fixed structure. A focusing device 700 is also provided for driving the first lens group 201 to move back and forth. An optical axis of the infrared monitoring module 300 at rear of the third light splitting element 500 is coaxial with that of the projection objective 200. Optical characteristics of the projection objective 200 and the monitoring objective require special design to ensure that, during telescopic movement of the first lens group 201 driven by the focusing device, while the projection objective focuses clearly, the infrared monitoring image received by the sensor chip 301 is clear enough to meet monitoring requirements synchronously. Besides, since the infrared monitoring system and the projection module share a single imaging system, position and dimension of the sensed image formed on the sensor chip are changeless at any working distance provided that the projected image is focused clearly. Specifically, the projection module and the infrared monitoring module should meet some requirements as follows.

(1) When an active area of a display chip in the projection module is larger than an area of the infrared monitoring image formed on the sensor chip corresponding to the projected image, an optical magnification of the monitoring objective is larger than that of the optical system formed from the third light splitting element 500 to the display chip. The projected image in this disclosure means a portion of the projection plane 600 occupied by an image projected onto the projection plane 600.

(2) When the active area of the display chip in the projection module is smaller than the area of the infrared monitoring image formed on the sensor chip corresponding to the projected image, the optical magnification of the monitoring objective is smaller than that of the optical system formed from the third light splitting element 500 to the display chip.

(3) When the active area of the display chip in the projection module is equal to the area of the infrared monitoring image formed on said sensor chip formed on the sensor chip corresponding to the projected image, the optical magnification of the monitoring objective is equal to that of the optical system formed from the third light splitting element 500 to the display chip.

Besides, in order to ensure the infrared monitoring without blind areas, an optical angle of an optical path of the infrared light at a surface of the first lens of the first lens group 201, which infrared light is reflected back from the projection plane 600 to the sensor chip 301 to form the infrared monitoring image, should be larger than or equal to an emergent light angle of a projected light at the surface of the first lens.

In other embodiments, the projection objective and the infrared light source can be structures as shown in FIG. 8. It can be seen from FIG. 8 that, the projection objective 200 further includes a second lens group 202, and the third light splitting element 500 locates between the first lens group 201 and the second lens group 202. In such case, the first lens group 201 is capable of moving back and forth, while the second lens group 202 and the light splitting element 500 are fixed structures. Light of the projection light source 100 passes through the second lens group 202, the third light splitting element 500 and the first lens group 201 in turn to outside. The focusing device 700 is used for driving the first lens group 201 to move back and forth. Other structures and operation principle of this embodiment are similar to those in the embodiment shown in FIG. 7.

The invention claimed is:

1. An infrared interactive remote control device, comprising a housing; a power supply, a visible light source and an infrared light source are mounted within the housing, and visible light and infrared light are emitted out along a same optical axis after passing through a light splitting element; wherein, the power supply is connected with the visible light source through a first switch unit; the power supply is connected with the infrared light source through the first switch unit and a second switch unit successively, or the power supply is directly connected with the infrared light source through the second switch unit, wherein the second switch unit comprises a control button; a pattern disc which is rotatable around a rotating shaft is disposed within the housing and arranged on an optical path of the visible light source; at least two pattern holes allowing the light to pass through are arranged on the pattern disc; the control button of the second switch unit is in mechanical connection with the pattern disc and is capable of driving the pattern disc to rotate about said rotating shaft; in a normal state, an indication pattern hole of the at least two pattern holes is positioned on the optical path to allow the visible light to pass through; when the control button is pressed down, the control button synchronously drives the pattern disc to rotate so that a control pattern hole of the at least two pattern holes is positioned on the optical path to allow the visible light to pass through.

2. The infrared interactive remote control device of claim 1, wherein the light splitting element is further constituted as a first light splitting element; the visible light from the visible light source passes through a first lens assembly and one of the pattern holes on the pattern disc, transmits through the first light splitting element, and then emits out; the infrared light from the infrared light source passes through a second lens assembly, gets reflected by a first reflector and the first light splitting element, and then emits out with the visible light after the two merge together.

3. The infrared interactive remote control device of claim 1, wherein the light splitting element is further constituted as a first light splitting element; the visible light from the visible light source passes through a first lens assembly and then transmits through the first light splitting element; the infrared light from the infrared light source passes through a second lens assembly, gets reflected by a first reflector and the first light splitting element, and then merges with the visible light, wherein the merged visible light and infrared light are emitted out through one of the pattern holes on the pattern disc.

4. The infrared interactive remote control device of claim 1, wherein the light splitting element is further constituted as a second light splitting element; the visible light from the visible light source passes through a first lens assembly and one of the pattern holes on the pattern disc, gets reflected by a second reflector and the second light splitting element, and then emits out; the infrared light from the infrared light source passes through a second lens assembly, transmits through the second light splitting element, and then emits out with the visible light after the two merge together; or, the visible light from the visible light source passes through a first lens assembly, gets reflected by a second reflector, passes through one of the pattern holes on the pattern disc, gets reflected by the second light splitting element, and then emits out; the infrared light from the infrared light source passes through a second lens assembly, transmits through the second light splitting element, and then emits out with the visible light after the two merge together.

5. The infrared interactive remote control device of claim 1, wherein the light splitting element is further constituted as a second light splitting element; the visible light from the visible light source passes through a first lens assembly, gets reflected by a second reflector and the second light splitting element, and then emits out; the infrared light from the infrared light source passes through a second lens assembly, transmits through the second light splitting element, and then merges with the visible light, wherein the merged visible light and infrared light are emitted out through one of the pattern holes on the pattern disc.

6. The infrared interactive remote control device of claim 2, wherein the visible light source is a LASER one, a VCSEL one or an LED one, and its emergent light angle from the first lens assembly is less than 2 degree; the infrared light source is a LASER one, a VCSEL one or an LED one, and its emergent light angle from the second lens assembly is less than 2 degree.

7. The infrared interactive remote control device of claim 1, wherein a remote control unit operable to send remote control signal to a projection system is arranged within the housing; the remote control unit comprises an infrared modulated light generator and at least one remote control button connected therewith.

8. A projection system, comprising a projection module and an infrared monitoring module; the projection module comprises a projection light source and a projection objective, wherein light from the projection light source is emitted out after successively passing through a third light splitting element and a first lens group of the projection objective; the infrared monitoring module comprises a monitoring objective and an sensor chip; an optical axis of the infrared monitoring module at rear of the third light splitting element is coaxial with that of the projection objective;

wherein the projection system further comprises an infrared interactive remote control device comprising a housing; a power supply, a visible light source and an infrared light source are mounted within the housing, and visible light and infrared light are emitted out along a same optical axis after passing through a light splitting element; wherein, the power supply is connected with the visible light source through a first switch unit; the power supply is connected with the infrared light source through the first switch unit and a second switch unit successively, or the power supply is directly connected with the infrared light source through the second switch unit, wherein the second switch unit comprises a control button; a pattern disc which is rotatable around a rotating shaft is disposed within the housing and arranged on an optical path of the visible light source; at least two pattern holes allowing the light to pass through are arranged on the pattern disc; the control button of the second switch unit is in mechanical connection with the pattern disc and is capable of driving the pattern disc to rotate about said rotating shaft; in a normal state, an indication pattern hole of the at least two pattern holes is positioned on the optical path to allow the visible light to pass through; when the control button is pressed down, the control button synchronously drives the pattern disc to rotate so that a control pattern hole of the at least two pattern holes is positioned on the optical path to allow the visible light to pass through;

infrared light from the infrared interactive remote control device is projected onto a projection plane of the projection system, and the infrared light reflected by the projection plane passes through the first lens group and the third light splitting element to the infrared monitoring module.

9. The projection system of claim 8, wherein the projection objective also comprises a second lens group, and the third light splitting element is arranged between the first and the second lens groups; the light from the projection light source is emitted out after passing through the second lens group, the third light splitting element and the first lens group successively.

10. The projection system of claim 8, wherein further comprising a focusing device for driving one or more lens of the first lens group to move back and forth; optical characteristics of the projection objective and the monitoring objective is able to ensure that, during telescopic movement of the one or more lens of the first lens group driven by the focusing device, while the projection objective focuses clearly, the infrared monitoring image received by the sensor chip meets monitoring requirements synchronously.

11. The projection system of claim 8, wherein the light splitting element is further constituted as a first light splitting element; the visible light from the visible light source passes through a first lens assembly and one of the pattern holes on the pattern disc, transmits through the first light splitting element, and then emits out; the infrared light from the infrared light source passes through a second lens assembly, gets reflected by a first reflector and the first light splitting element, and then emits out with the visible light after the two merge together.

12. The projection system of claim 8, wherein the light splitting element is further constituted as a first light splitting element; the visible light from the visible light source passes through a first lens assembly and then transmits through the first light splitting element; the infrared light from the infrared light source passes through a second lens assembly, gets reflected by a first reflector and the first light splitting element, and then merges with the visible light, wherein the merged visible light and infrared light are emitted out through one of the pattern holes on the pattern disc.

13. The projection system of claim 8, wherein the light splitting element is further constituted as a second light splitting element; the visible light from the visible light source passes through a first lens assembly, gets reflected by a second reflector and the second light splitting element, and then emits out; the infrared light from the infrared light source passes through a second lens assembly, transmits through the second light splitting element, and then merges with the visible light, wherein the merged visible light and infrared light are emitted out through one of the pattern holes on the pattern disc.

14. The projection system of claim 8, wherein the light splitting element is further constituted as a second light splitting element; the visible light from the visible light source passes through a first lens assembly and one of the pattern holes on the pattern disc, gets reflected by a second reflector and the second light splitting element, and then emits out; the infrared light from the infrared light source passes through a second lens assembly, transmits through the second light splitting element, and then emits out with the visible light after the two merge together;

or, the visible light from the visible light source passes through a first lens assembly, gets reflected by a second reflector, passes through one of the pattern holes on the pattern disc, gets reflected by the second light splitting element, and then emits out; the infrared light from the infrared light source passes through a second lens assembly, transmits through the second light splitting element, and then emits out with the visible light after the two merge together.

15. The projection system of claim 8, wherein a remote control unit operable to send remote control signal to a projection system is arranged within the housing; the remote control unit comprises an infrared modulated light generator and at least one remote control button connected therewith.

* * * * *